H. R. STAFFORD.
STEAM ENGINE VALVE REVERSING GEAR.
APPLICATION FILED FEB. 19, 1917.
1,230,049.
Patented June 12, 1917.
2 SHEETS—SHEET 1.
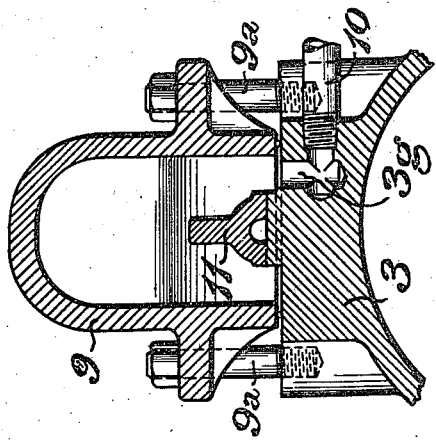
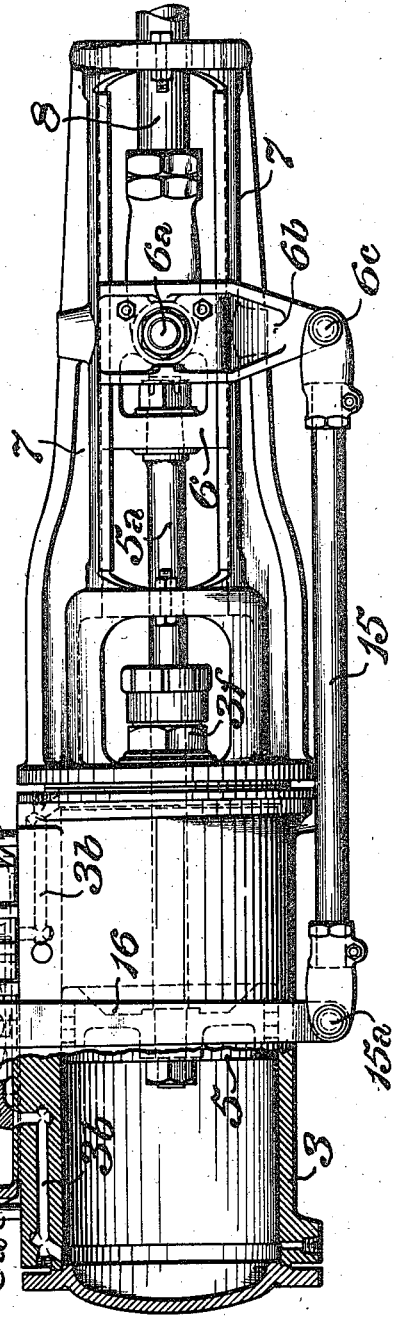
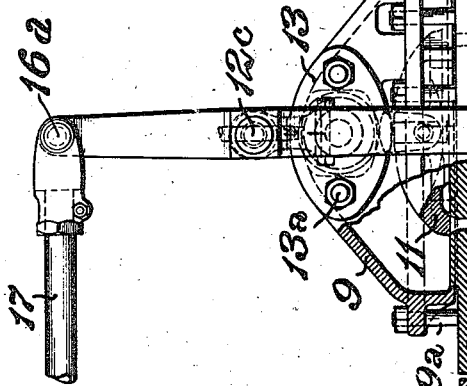
WITNESSES
INVENTOR H. R. STAFFORD.
STEAM ENGINE VALVE REVERSING GEAR.
APPLICATION FILED FEB. 19, 1917.
1,230,049.
Patented June 12, 1917.
2 SHEETS—SHEET 2.
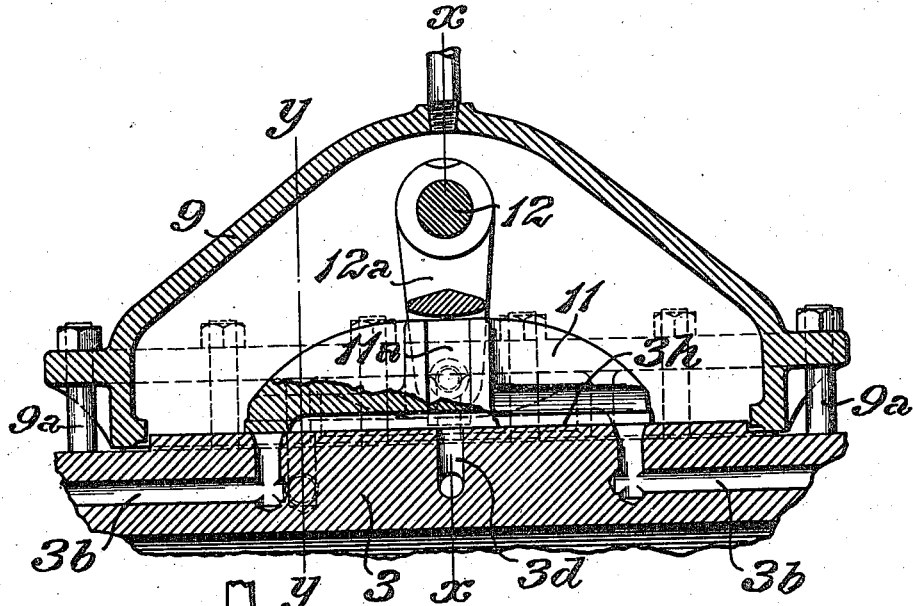
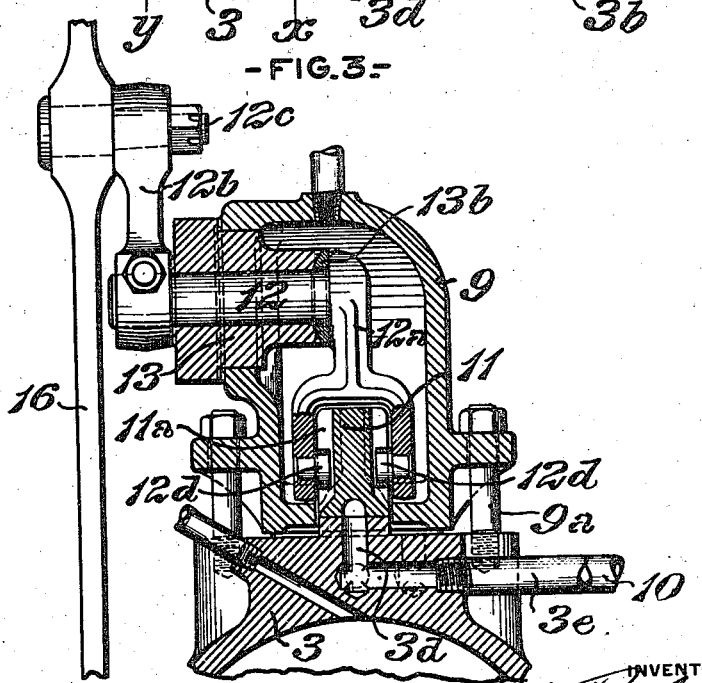

UNITED STATES PATENT OFFICE.

HAL R. STAFFORD, OF PLAINFIELD, NEW JERSEY, ASSIGNOR TO ECONOMY DEVICES CORPORATION, OF NEW YORK, N. Y., A CORPORATION OF NEW YORK.

STEAM-ENGINE VALVE REVERSING-GEAR.

1,230,049.  Specification of Letters Patent.  Patented June 12, 1917.

Application filed February 19, 1917. Serial No. 149,388.

*To all whom it may concern:*

Be it known that I, HAL R. STAFFORD, of Plainfield, in the county of Union and State of New Jersey, have invented a certain new and useful Improvement in Steam-Engine Valve Reversing-Gears, of which improvement the following is a specification.

My invention relates to power actuated valve reversing gears, of the general class or type of that set forth in the patent of E. L. Ragonnet, No. 930,225, dated August 3, 1909, and its object is, to effect a substantial simplification of structure and economization of cost, in a reversing gear of such type, as well as to attain easier manipulation by the operator and greater sensitiveness in operation.

The improvement claimed is hereinafter fully set forth.

In the accompanying drawings: Figure 1 is a side view, partly in section, of a valve reversing gear illustrating an embodiment of my invention; Fig. 2, a vertical longitudinal central section, on an enlarged scale, through the valve chest thereof; and, Figs. 3 and 4, transverse sections, on the lines $x$ $x$ and $y$ $y$, respectively, of Fig. 2, through the valve chest.

In the practice of my invention, referring descriptively to the specific embodiment thereof which is herein exemplified, I provide a reversing cylinder, 3, which is adapted to be suitably supported on the boiler of a locomotive engine, or in any other location from which connection may be made with the valve gear which it is designed to control. The reversing cylinder is fitted with a properly packed piston, 5, fixed on one end of a piston rod, $5^a$, which passes through a stuffing box, $3^f$, in one of the heads of the cylinder, and is secured, at its opposite end, to a cross head, 6, fitted to traverse between guides, 7, connected to the cylinder. The cross head, 6, is coupled, by a pin, $6^a$, to a reach rod, 8, the opposite end of which is coupled to the reverse shaft of a distribution valve gear, which may be of any of the known types, and as it does not form part of my present invention, will not be herein described.

Motive fluid, which may be compressed air or steam, is admitted to, and exhausted from, opposite ends of the reversing cylinder, to effect the traverse of the piston thereof in either direction desired, by an actuating valve, 11, which is of the slide type, and is fitted to be reciprocated in a valve chest, 9, secured to the reversing cylinder, 3, by bolts $9^a$. The valve, 11, is fitted to slide on a valve face, $3^h$, formed on the reversing cylinder, said valve face having admission ports, $3^b$, $3^b$, leading to opposite ends of the cylinder, and an exhaust port, $3^d$, leading to an exhaust pipe, $3^e$. Motive fluid is admitted to the valve chest through a supply pipe, 10, leading from a compressed air reservoir or other source of fluid pressure supply, and communicating with a supply port, $3^g$, leading into the valve chest on one side of the valve face, $3^f$.

Movement is imparted to the actuating valve through a floating lever, 16, one end of which is coupled by a pin, $16^a$, to a link 17, which is, in turn, coupled to a manually operated reverse lever (not shown) of the ordinary type, which is located in such position as to be conveniently accessible by the operator. The opposite end of the floating lever is coupled, by a pin, $15^a$, to a link, 15, which is, in turn, coupled, by a pin, $6^c$, to a downwardly extending arm, $6^b$, on the cross head, 6. A rock shaft, 12, is journaled, transversely to the actuating valve, in a bearing, 13, extending through one of the side walls of the valve chest, and secured removably thereto by bolts, $13^a$. The outer end of the rock shaft carries an arm, $12^b$, which is coupled, by a pin, $12^c$, to the floating lever, 16, and an arm, $12^a$, is formed on, or secured to, its inner end. Leakage of motive fluid around the rock shaft is prevented by a ball joint ring, $13^b$, which is interposed between the inner end of the bearing, 13, and the arm, $12^a$. The lower end of the arm, $12^a$, is forked, as shown in Fig. 3, each of the members of the fork having a block, $12^d$, which may be either in the form of a roller or a die block, journaled on a pin fixed in and projecting inwardly from the fork member, said blocks engaging vertical recesses, $11^a$, formed in the actuating valve. The pins on which the blocks, $12^d$, are journaled, are, as shown, shouldered to prevent them from working outward, and are forced into place from the inside, and made tight by being riveted over on their outer ends. The valve is prevented from being accidentally displaced, or having its movement disturbed, beyond a limited and permissible amount, by the curved portion of the rocker arm at the junction of the forks, regardless of the angle of the rocker arm. It will be seen that when the valve is in place, it and its connections with the rocker arm, 12ª, are automatically locked against displacement, when the valve chest is connected to its seat on the reversing cylinder. By this construction, movement of the rock shaft about its axis, imparts rectilineal movement to the actuating valve, without disturbance of the normal relation thereof to the valve face.

In the operation of a valve reversing gear of a construction substantially as hereinbefore described, the actuating valve, 11, is moved by the manually operated reverse lever, through the link, 17, floating lever, 16, rock shaft, 12, and arms, 12ᵇ 12ª, to open one or the other of the reversing cylinder admission ports, 3ᵇ, according to the direction of movement which it is desired to impart to the reverse shaft of the valve gear. The resultant admission of motive fluid moves the cross head, 6, in the desired direction, and to the desired extent, the cross head carrying with it the floating lever, 16, which moves on the pin, 16ª, as a fulcrum. The movement of said lever is, through the rock shaft, 12, and its arms, 12ᵇ, 12ª, transmitted to the actuating valve, 11, which it moves in the opposite direction to that of its traverse by the reverse lever, and closes both the admission ports of the reversing cylinder, the piston of which is thereby locked in position corresponding with the adjusted position of the valve gear.

It will be seen that by reason of the elimination of the ordinary valve stem and its stuffing box, the only packed stuffing box which is required is that of the piston rod of the reversing cylinder, and the application of the rock shaft, for the transmission of the movement of the throttle lever to the actuating valve, eliminates the friction which is encountered in the movement of the ordinary sliding valve stem, thereby correspondingly affording easier manipulation of the throttle lever. The structural simplification of the appliance will also be apparent to those familiar with power actuated reversing gears.

I claim as my invention and desire to secure by Letters Patent:

1. In a valve reversing mechanism, the combination of a fluid pressure motor; a reciprocatory actuating valve controlling the supply and exhaust of motive fluid to and from said motor; a floating lever; manually operable means for moving said lever; automatically operable means for moving said lever by the motor, in an opposite direction; an oscillatory member interposed between and coupled to the floating lever and the actuating valve; and means, interposed between said oscillatory member and the actuating valve, for preventing displacement or disturbance of movement of said valve.

2. In a valve reversing mechanism, the combination of a fluid pressure motor; a valve chest; an actuating valve fitted to reciprocate in said chest and control the supply and exhaust of fluid to and from said motor, said valve having vertical lateral recesses; a floating lever; manually operable means for moving said lever; automatically operable means for moving said lever by the motor in an opposite direction; a rock shaft journaled in the valve chest, transversely to the actuating valve; an arm coupling said rock shaft to the floating lever; an arm depending from said rock shaft and having a forked lower end embracing the actuating valve; pins fixed in and projecting inwardly from the forks of said arm, and blocks journaled on said pins and engaging the lateral recesses of the actuating valve.

3. In a valve reversing mechanism, the combination of a reversing cylinder; a piston fitted therein; a piston rod secured to said piston; a valve chest having admission ports communicating with opposite ends of the cylinder, and an exhaust port; a laterally recessed actuating valve fitted to traverse longitudinally in the valve chest and control said ports; a bearing fixed in the valve chest, transversely to the actuating valve; a rock shaft journaled in said bearing; a floating lever; manually operable means for moving said lever; means, actuated by the piston rod of the reversing cylinder, for moving said lever in opposite direction; an arm fixed to the rock shaft, exterior to the valve chest, and coupled to the floating lever; an arm fixed on said shaft, within the valve chest and fitting over the actuating valve; and blocks journaled on said arm and engaging the lateral recesses of the actuating valve.

HAL R. STAFFORD.

Witnesses:
   Victor A. Stronske,
   Nellie J. McAfee.